United States Patent
Karam et al.

(10) Patent No.: US 12,314,312 B2
(45) Date of Patent: *May 27, 2025

(54) METHODS AND SYSTEMS FOR PROCESSING IMAGERY

(71) Applicant: Google LLC, Mountain View, CA (US)

(72) Inventors: David Karam, Los Gatos, CA (US); Li Zhang, Seattle, WA (US); Ariel Gilder, Fair Lawn, NJ (US); Yuzo Watanabe, Seattle, WA (US); Eric Penner, Redmond, WA (US); Farooq Ahmad, Shoreline, WA (US); Hartwig Adam, Marina del Rey, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/592,132

(22) Filed: Feb. 29, 2024

(65) Prior Publication Data
US 2024/0202232 A1 Jun. 20, 2024

Related U.S. Application Data

(63) Continuation of application No. 17/049,452, filed as application No. PCT/US2018/051523 on Sep. 18, 2018, now Pat. No. 11,947,591.

(51) Int. Cl.
*G06F 16/583* (2019.01)
*G06F 16/535* (2019.01)
(Continued)

(52) U.S. Cl.
CPC .......... *G06F 16/583* (2019.01); *G06F 16/535* (2019.01); *G06F 16/55* (2019.01); *G06N 20/00* (2019.01)

(58) Field of Classification Search
CPC ...... G06F 16/583; G06F 16/535; G06F 16/55; G06F 16/75; G06F 16/783; G06F 8/36; G06F 9/451; G06N 20/00
(Continued)

(56) References Cited

U.S. PATENT DOCUMENTS 9,836,819 B1 12/2017 Donsbach et al.
10,943,255 B1 * 3/2021 Andreou ............ G06Q 30/0244
(Continued)

FOREIGN PATENT DOCUMENTS

CN 102549603 7/2012
CN 108198177 6/2018
(Continued)

OTHER PUBLICATIONS

Chinese Search Report for Corresponding Application No. 2018800927038, dated Sep. 5, 2023, 2 pages.
(Continued)

*Primary Examiner* — Charlotte M Baker
(74) *Attorney, Agent, or Firm* — DORITY & MANNING P.A.

(57) ABSTRACT

The present disclosure is directed to processing imagery using one or more machine learning (ML) models. In particular, data describing imagery comprising a plurality of different and distinct frames can be received; and based at least in part on one or more ML models and the data describing the imagery, and for each frame of the plurality of different and distinct frames, one or more scores can be determined for the frame. Each score of the score(s) can indicate a determined measure of suitability of the frame with respect to one or more of various different and distinct uses for which the ML model(s) are configured to determine suitability of imagery.

18 Claims, 9 Drawing Sheets

(51) Int. Cl.
 *G06F 16/55* (2019.01)
 *G06N 20/00* (2019.01)
(58) Field of Classification Search
 USPC .......................................................... 382/305
 See application file for complete search history.

(56) References Cited

U.S. PATENT DOCUMENTS

| | | | |
|---|---|---|---|
| 2011/0047163 A1 | 2/2011 | Chechik et al. |
| 2015/0341667 A1 | 11/2015 | Liao et al. |
| 2016/0070962 A1 | 3/2016 | Shetty et al. |
| 2016/0378863 A1 | 12/2016 | Shlens et al. |

FOREIGN PATENT DOCUMENTS

| | | |
|---|---|---|
| CN | 108234870 | 6/2018 |
| JP | 2008/167155 | 7/2008 |
| JP | 2016/539433 | 12/2016 |
| JP | 2017/098640 | 6/2017 |
| JP | 2017530434 | 10/2017 |

OTHER PUBLICATIONS

Extended European Search Report Corresponding to Application No. 22150997.9 on Apr. 12, 2022.
International Preliminary Report on Patentability for PCT/US2018/051523, mailed on Apr. 1, 2021, 11 pages.
International Search Report for PCT/US2018/051523, mailed on Jul. 2, 2019, 2 pages.

\* cited by examiner

METHODS AND SYSTEMS FOR PROCESSING IMAGERY

PRIORITY CLAIM

The present application is a continuation of U.S. application Ser. No. 17/049,452 having a filing date of Oct. 21, 2020, which is based upon and claims the right of priority under 35 U.S.C. § 371 to International Application No. PCT/US2018/051523 filed on Sep. 18, 2018. Applicant claims priority to and the benefit of each of such applications and incorporates all such applications herein by reference in its entirety.

FIELD

The present disclosure relates generally to digital imagery. More particularly, the present disclosure relates to processing imagery using one or more machine learning (ML) models.

BACKGROUND

Computing devices (e.g., desktop computers, laptop computers, tablet computers, smartphones, wearable computing devices, and/or the like) are ubiquitous in modern society. They can support communications between their users, provide their users with information about their environments, current events, the world at large, and/or the like. A popular use of such devices is generating, manipulating, communicating, and/or the like digital imagery (e.g., pictures, video, and/or the like).

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include providing, by one or more computing devices, an application programming interface (API) for processing imagery using one or more machine learning (ML) models to identify imagery determined to be suitable for one or more different and distinct uses. The method can also include receiving, by the computing device(s), from a requesting application, and via the API, data describing imagery comprising a plurality of different and distinct frames for processing using the ML model(s). The method can further include determining, by the computing device(s), based at least in part on the ML model(s) and the data describing the imagery, and for each frame of the plurality of different and distinct frames, one or more scores for the frame. Each score of the score(s) can indicate a determined measure of suitability of the frame with respect to a use of the different and distinct use(s). The method can further include communicating, by the computing device(s), to the requesting application, and via the API, data indicating, for each frame of one or more frames of the plurality of different and distinct frames, at least one of the score(s) for the frame.

Another example aspect of the present disclosure is directed to a system. The system can include one or more processors and a memory storing instructions that when executed by the processor(s) cause the system to perform operations. The operations can include receiving data describing imagery comprising a plurality of different and distinct frames. The operations can also include determining, based at least in part on one or more ML models and the data describing the imagery, and for each frame of the plurality of different and distinct frames, one or more scores for the frame. Each score of the score(s) can indicate a determined measure of suitability of the frame with respect to one or more of various different and distinct uses for which the ML model(s) are configured to determine suitability of imagery.

A further example aspect of the present disclosure is directed to one or more non-transitory computer-readable media. The non-transitory computer-readable media can comprise instructions that when executed by one or more computing devices cause the computing device(s) to perform operations. The operations can include utilizing one or more ML models to determine, based at least in part on data describing imagery comprising a plurality of different and distinct frames, and for each frame of the plurality of different and distinct frames, one or more scores for the frame. Each score of the score(s) can indicate a determined measure of suitability of the frame with respect to one or more of various different and distinct uses for which the ML model(s) are configured to determine suitability of imagery.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Figure 1:
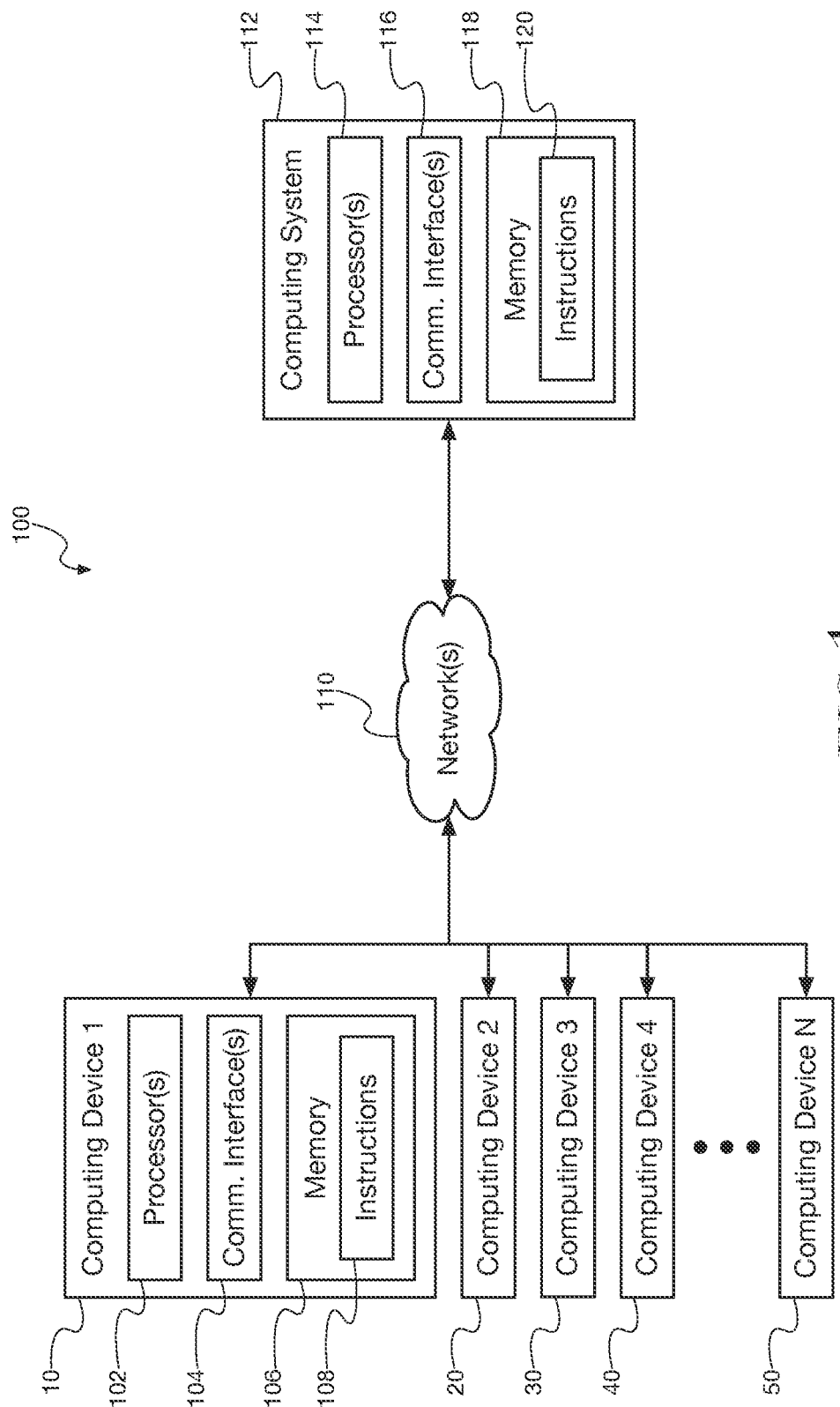
FIG. 1 depicts an example computing environment according to example embodiments of the present disclosure.

Example aspects of the present disclosure are directed to processing imagery using one or more machine learning (ML) models. In particular, one or more computing devices can receive data describing imagery comprising a plurality of different and distinct frames (e.g., individual still images, component frames of one or more videos, and/or the like). Based at least in part on one or more ML models and the data describing the imagery, the computing device(s) can determine, for each frame of the plurality of different and distinct frames, one or more scores for the frame. Each score of the score(s) can indicate a determined measure of suitability of the frame with respect to one or more of various different and distinct uses for which the ML model(s) are configured to determine suitability of imagery.

Such uses can include, for example, use with a particular application (e.g., an email application, a messaging application, a social-media application, and/or the like); use with a particular audience (e.g., the public at large, a messaging group, a list of particular recipients, friends, family members, work colleagues, and/or the like); inclusion in a series of frames for sequential presentation (e.g., a slideshow, montage, and/or the like); use as a representative, thumbnail, cover, and/or the like for an album, set, series, and/or the like of related frames; and/or the like.

In some embodiments, the computing device(s) can provide an application programming interface (API) for processing imagery using the ML model(s), for example, to identify imagery determined to be suitable for one or more of the various different and distinct uses. In some of such embodiments, the computing device(s) can receive the data describing the imagery via the API (e.g., from a requesting application, and/or the like). In some embodiments, the computing device(s) can communicate (e.g., via the API, to the requesting application, and/or the like) data indicating, for each frame of one or more frames of the plurality of different and distinct frames, at least one of the score(s) for the frame. Based at least in part on such data, in some of such embodiments, the computing device(s) can generate data describing an interface comprising a curation (e.g., for presentation, browsing, manipulation, and/or the like) of at least a portion of such frame(s).

In some embodiments, the computing device(s) can determine, for one or more frames in a set of frames included in the plurality of different and distinct frames, one or more scores indicating the frame(s) in the set are determined to be better suited for one or more particular uses of the various different and distinct uses than each other frame in the set. In some of such embodiments, the computing device(s) can receive (e.g., via the API, from the requesting application, and/or the like) data indicating the particular use(s) (e.g., in association with a request to identify one or more frames suitable for such use(s), and/or the like).

In some embodiments, the set of frames can include a series of contemporaneously generated similar frames (e.g., a burst, stream, and/or the like). Each frame in the series can include one or more subjects (e.g., people, animals, objects of focus, and/or the like) shared with each other frame in the series, and a contextual background (e.g., associated with the setting, surrounding environment, and/or the like), of the one or more subjects, shared with each other frame in the series. Additionally or alternatively, the set of frames can include a set of different and distinct frames including frames from multiple different and distinct series of frames. Each frame in such set can include one or more subjects different and distinct from each other frame in such set, and/or a contextual background, of one or more subjects of the frame in such set, different and distinct from each other frame in such set.

In some embodiments, the computing device(s) can receive (e.g., via the API, from the requesting application, in association with a request to identify one or more frames, and/or the like) data indicating one or more particular subjects of the plurality of different and distinct frames, one or more particular expressions (e.g., smiling, open eyes, laughter, and/or the like) exhibited by subjects of the plurality of different and distinct frames, one or more particular events (e.g., scoring a point in a sporting event, and/or the like) depicted by the plurality of different and distinct frames, and/or the like. In some of such embodiments, determining the score(s) for each of the plurality of different and distinct frames can include identifying, from amongst the plurality of different and distinct frames, a set of frames that each include the particular subject(s), expression(s), event(s), and/or the like.

In some embodiments, the computing device(s) can (e.g., in association with a request to identify one or more frames for inclusion in a slideshow, montage, and/or the like) determine, for each of one or more frames (e.g., based at least in part on the score(s) for such frame(s), and/or the like), a position of the frame in a series of frames for sequential presentation. In some of such embodiments, the computing device(s) can communicate (e.g., via the API, to the requesting application, and/or the like) data indicating, for each frame of such frame(s), the position of the frame in the series of frames for sequential presentation.

In some embodiments, the data describing the imagery can be generated based at least in part on one or more arrangements of pixels included in the imagery (e.g., the visual content of the imagery, and/or the like) but not be sufficient to enable reconstruction of such arrangement(s) (e.g., to mitigate privacy concerns, and/or the like).

In some embodiments, the computing device(s) can generate the ML model(s) based at least in part on data (e.g., training data, and/or the like) describing other imagery and user input with respect to such imagery. In some embodiments, the data describing such other imagery and user input can be received from a particular user device from which the data describing the imagery comprising the plurality of different and distinct frames is received. Additionally or alternatively, the data describing the other imagery and user input can be received from one or more user devices different and distinct from the particular user device from which the data describing the imagery comprising the plurality of different and distinct frames is received.

In some embodiments, the ML model(s) can be, otherwise include, and/or the like various ML models, such as neural networks (e.g., deep neural networks, and/or the like), other types of ML models, including non-linear models, linear models, multilayer models, and/or the like. Neural networks can include feed-forward neural networks, recurrent neural networks (e.g., long short-term memory recurrent neural networks, and/or the like), convolutional neural networks, other forms of neural networks, and/or the like. In some embodiments, the ML model(s) can be trained using supervised techniques, semi-supervised techniques, unsupervised techniques, and/or the like.

The technology described herein can provide a number of technical effects and benefits. For example, the technology described herein can enable efficient identification, organization, generation, and/or the like of imagery (e.g., one or more frames, sets of frames, series of frames, and/or the like) suitable for one or more particular uses, thus obviating or reducing otherwise required user effort and device interaction, and thereby conserving computing resources (e.g., energy, processing cycles, network bandwidth, and/or the like).

With reference now to the figures, example embodiments of the present disclosure will be discussed in further detail.

FIG. 1 depicts an example computing environment according to example embodiments of the present disclosure.

Referring to FIG. 1, environment 100 can include one or more computing devices (e.g., one or more desktop computers, laptop computers, tablet computers, mobile devices, smartphones, wearable devices, servers, and/or the like). For example, environment 100 can include computing devices 10, 20, 30, 40, and 50 and computing system 112, which can include one or more computing devices. Environment 100 can also include one or more networks 110 (e.g., one or more wired networks, wireless networks, and/or the like). Network(s) 110 can interface computing device(s) 10, 20, 30, 40, and/or 50 with one another and/or with computing system 112.

Computing device 10 can include one or more processor(s) 102, one or more communication interfaces 104, and memory 106 (e.g., one or more hardware components for storing executable instructions, data, and/or the like). Communication interface(s) 104 can enable computing device 10 to communicate with computing device(s) 20, 30, 40, and/or 50 and/or with computing system 112. Memory 106 can include (e.g., store, and/or the like) instructions 108. When executed by processor(s) 102, instructions 108 can cause computing device 10 to perform one or more operations, functions, and/or the like described herein. It will be appreciated that computing device(s) 20, 30, 40, and/or 50 can include one or more of the components described above with respect to computing device 10.

Computing system 112 can include one or more processor(s) 114, one or more communication interfaces 116, and memory 118 (e.g., one or more hardware components for storing executable instructions, data, and/or the like). Communication interface(s) 116 can enable computing system 112 to communicate with computing device(s) 10, 20, 30, 40, and/or 50. Memory 118 can include (e.g., store, and/or the like) instructions 120. When executed by processor(s) 114, instructions 120 can cause computing system 112 to perform one or more operations, functions, and/or the like described herein.

Unless explicitly indicated otherwise, the operations, functions, and/or the like described herein can be performed by computing device(s) 10, 20, 30, 40, and/or 50 and/or computing system 112 (e.g., by computing device 10, 20, 30, 40, or 50, by computing system 112, by a combination of one or more of computing device(s) 10, 20, 30, 40, and/or 50 and/or computing system 112, and/or the like).

Figure 2A:
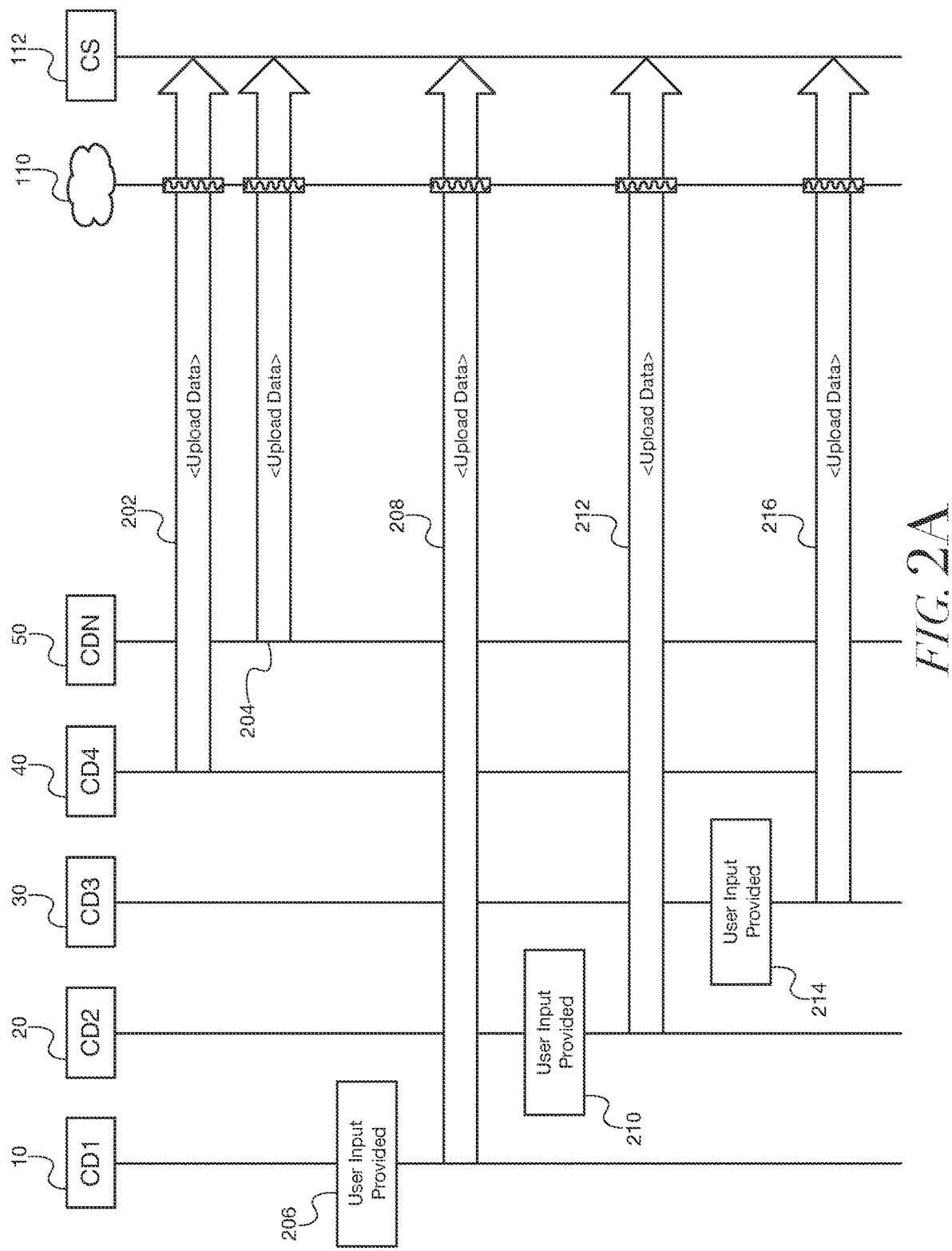
FIGS. 2A and 2B depict an example event sequence according to example embodiments of the present disclosure.
Figure 2B:
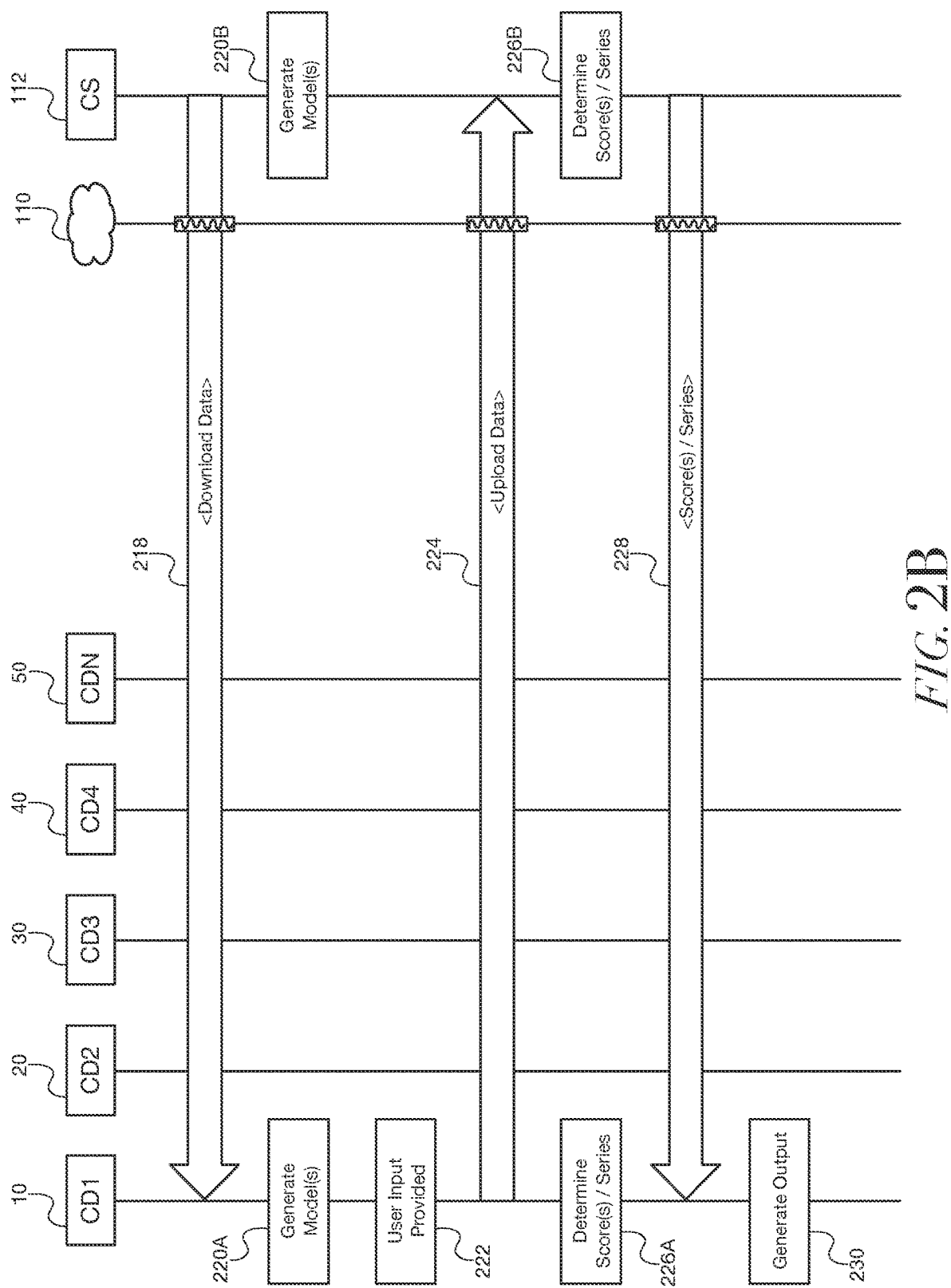

FIGS. 2A and 2B depict an example event sequence according to example embodiments of the present disclosure.

Referring to FIG. 2A, at (202), computing device 40 can generate data describing imagery, one or more aspects of the imagery, one or more uses for which the imagery is well suited, and/or the like and can communicate (e.g., via network(s) 110 (as indicated by the pattern-filled box over the line extending downward from network(s) 110), and/or the like) such data to computing system 112, which can receive the data. Similarly, at (204), computing device 50 can generate data describing imagery, one or more aspects of the imagery, one or more uses for which the imagery is well suited, and/or the like and can communicate such data to computing system 112, which can receive the data.

At (206), user input with respect to imagery can be provided via computing device 10 (e.g., the imagery can be utilized for one or more particular purposes for which it is well suited, and/or the like), and, at (208), computing device 10 can generate (e.g., based at least in part on the user input, and/or the like) data describing the imagery, one or more aspects of the imagery, the user input, one or more uses for which the imagery is well suited, and/or the like and can communicate such data to computing system 112, which can receive the data. Similarly, at (210), user input with respect to imagery can be provided via computing device 20, and, at (212), computing device 20 can generate (e.g., based at least in part on the user input, and/or the like) data describing the imagery, one or more aspects of the imagery, the user input, one or more uses for which the imagery is well suited, and/or the like and can communicate such data to computing system 112, which can receive the data; and, at (214), user input with respect to imagery can be provided via computing device 30, and, at (216), computing device 30 can generate (e.g., based at least in part on the user input, and/or the like) data describing the imagery, one or more aspects of the imagery, the user input, one or more uses for which the imagery is well suited, and/or the like and can communicate such data to computing system 112, which can receive the data.

For example, computing device 10 can be a user device (e.g., one or more associated computing devices at least temporarily associated with a particular user, user account, and/or the like). Similarly, computing device 20 can be a user device (e.g., one or more associated computing devices at least temporarily associated with a different and distinct user, user account, and/or the like) different and distinct from computing device 10; and computing device 30 can be a user device (e.g., one or more associated computing devices at least temporarily associated with a further different and distinct user, user account, and/or the like) different and distinct from computing devices 10 and 20.

Figure 3A:
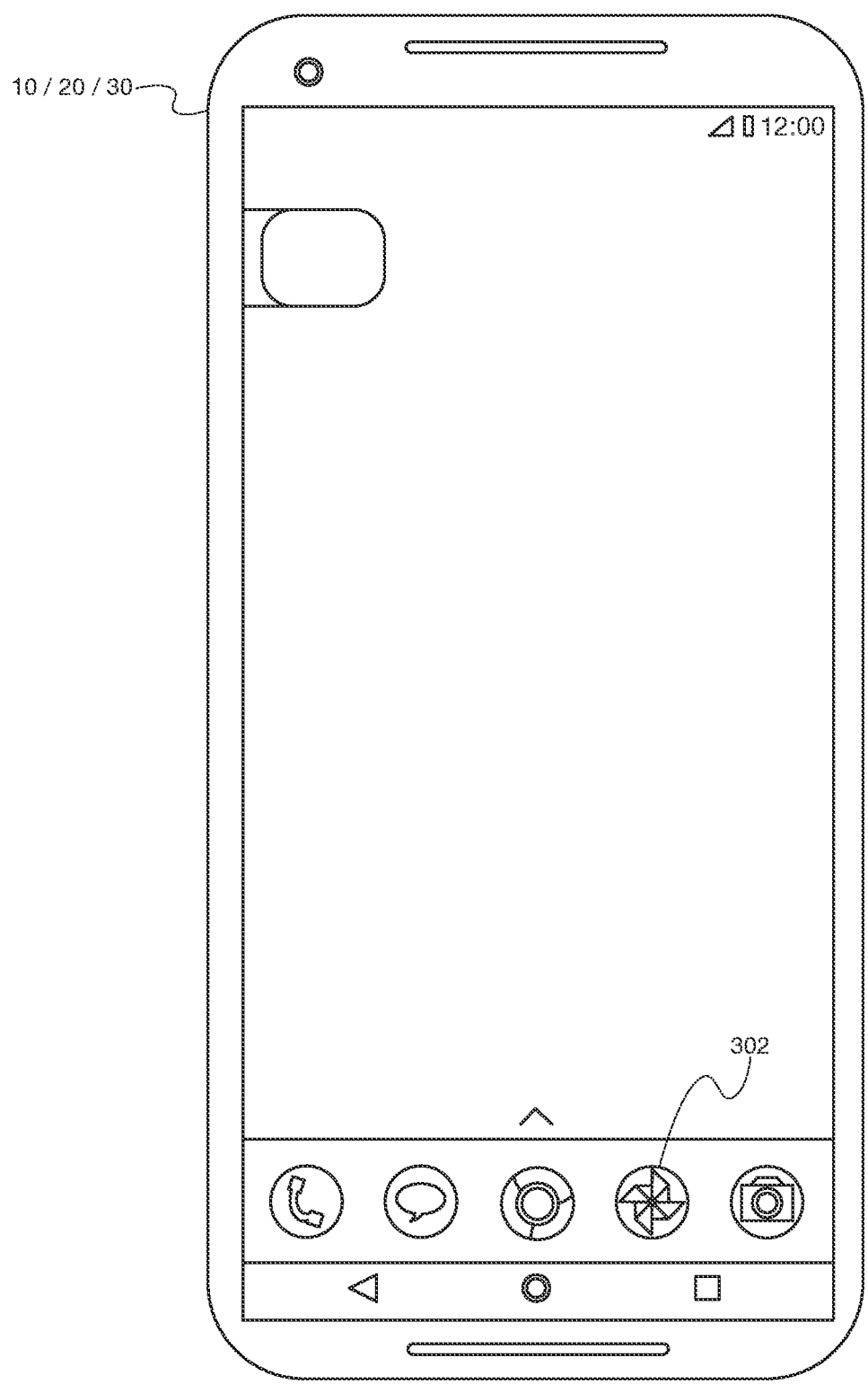
FIGS. 3A-D depict example graphical user interfaces (GUIs) according to example embodiments of the present disclosure.

Computing device(s) 10, 20, and/or 30 can execute one or more different and distinct applications. For example, referring to FIG. 3A, computing device(s) 10, 20, and/or 30 can execute an application (e.g., a photo-management application, and/or the like) associated with graphical user interface (GUI) element 302, and/or the like.

Figure 3B:
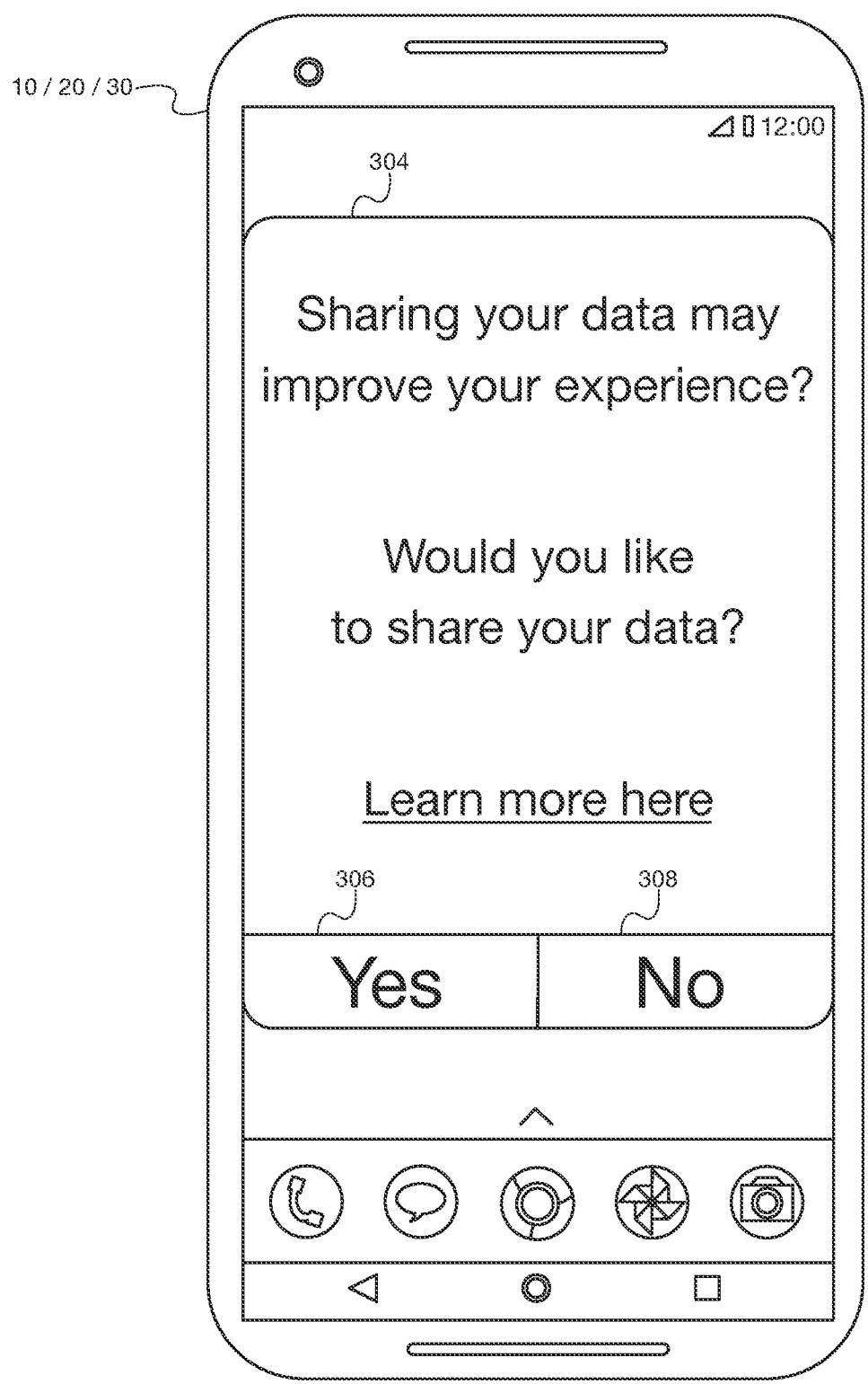

Referring to FIG. 3B, in some embodiments (e.g., to mitigate potential privacy concerns, and/or the like), one or more users of computing device(s) 10, 20, and/or 30 can be provided (e.g., via element 304, and/or the like) with information regarding collection of certain data, and/or the like, one or more controls (e.g., via element(s) 306 and/or 308, and/or the like) for allowing the user(s) to make one or more elections as to if and/or when the methods, systems, functions, operations, and/or the like described herein can enable collection of certain data, and/or the like (e.g., data describing imagery, one or more aspects of imagery, user input, one or more uses for which imagery is well suited, and/or the like). Additionally or alternatively, certain data (e.g., data describing imagery, one or more aspects of imagery, user input, one or more uses for which imagery is well suited, and/or the like) can be treated in one or more ways before being stored, utilized, and/or the like (e.g., so personally identifiable information can be removed, underlying visual content of imagery can be removed, abstracted, and/or the like). For example, a user's identity, imagery, data associated therewith, and/or the like can be treated so that no personally identifiable information can be determined for the user, the underlying visual content of imagery cannot be discerned, reconstructed, and/or the like. Thus, the user(s) can have control over what data is collected about them, how that information is used, what information they are provided, and/or the like.

In accordance with one or more aspects of the disclosure, computing system 112 and/or computing device(s) 10, 20, and/or 30 can provide an application programming interface (API) for processing imagery using one or more machine learning (ML) models, for example, to identify imagery determined to be suitable for one or more of various different and distinct uses for which the ML model(s) are configured to determine suitability of imagery, and/or the like. In some embodiments, the data (e.g., communicated at (208), (212), (216), and/or the like) describing the imagery, one or more aspects of the imagery, the user input, one or more uses for which the imagery is well suited, and/or the like can be communicated via such API, and/or the like. The various different and distinct uses can include, for example, use with a particular application (e.g., an email application, a messaging application, a social-media application, and/or the like); use with a particular audience (e.g., the public at large, a messaging group, a list of particular recipients, friends, family members, work colleagues, and/or the like); inclusion in a series of frames for sequential presentation (e.g., a slideshow, montage, and/or the like); use as a representative, thumbnail, cover, and/or the like for an album, set, series, and/or the like of related frames; and/or the like.

Referring to FIG. 2B, at (218), computing system 112 can generate (e.g., based at least in part on the data communicated at (202), (204), (208), (212), (216), and/or the like) data and can communicate such data to computing device 10, which can receive the data.

At (220), the ML model(s) configured to determine suitability of imagery for the various different and distinct uses can be generated. For example, at (220A), computing device 10 can generate (e.g., based at least in part on the data communicated at (208), (218), and/or the like) one or more of such ML model(s). Additionally or alternatively, at (220B), computing system 112 can generate (e.g., based at least in part on the data communicated at (202), (204), (208), (212), (216), and/or the like) one or more of such ML model(s).

Figure 4:
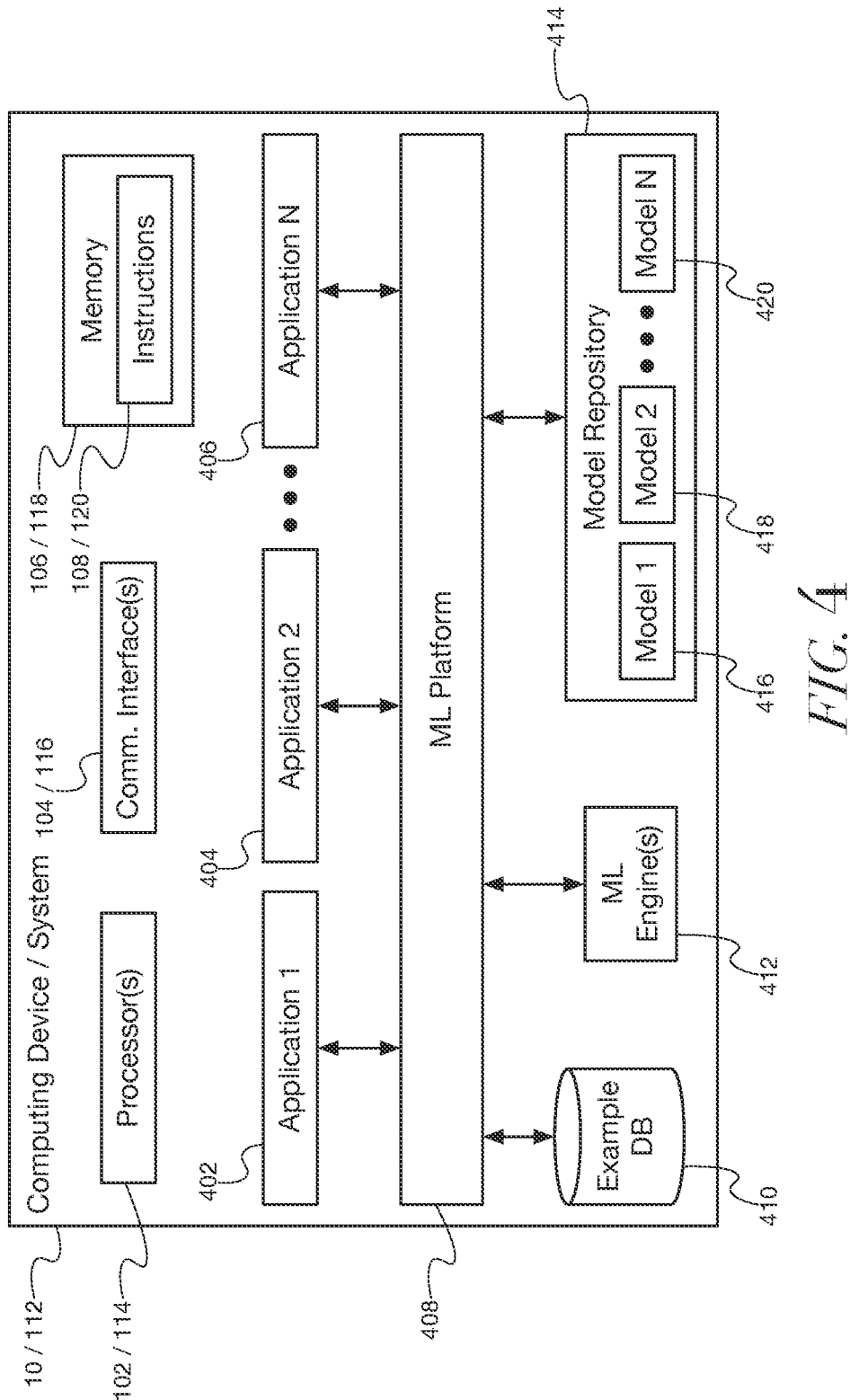
FIG. 4 depicts an example computing platform according to example embodiments of the present disclosure.

FIG. 4 depicts an example computing platform according to example embodiments of the present disclosure.

Referring to FIG. 4, computing device 10 and/or computing system 112 can execute one or more different and distinct applications 402, 404, and/or 406. For example, application 402 can be the application (e.g., the photo-management application, and/or the like) associated with element 302, and/or the like. Computing device 10 and/or computing system 112 can also execute ML platform 408, which can provide the API for processing imagery using the machine learning (ML) model(s). Such API can interface, enable communications between, and/or the like (e.g., via one or more calls, returns, and/or the like) ML platform 408 and application(s) 402, 404, and/or 406. It will be appreciated that computing device(s) 20 and/or 30 can provide functionality (e.g., associated with ML platform 408, and/or the like) similar to that described with respect to computing device 10 and/or computing system 112.

ML platform 408 can interface with model repository 414, which can include one or more ML models 416, 418, and/or 420 (e.g., the ML model(s) configured to determine suitability of imagery for the various different and distinct uses, and/or the like) generated by one or more ML engines 412, for example, based at least in part on one or more examples (e.g., training data, and/or the like) included in example database 410. Such example(s) can, for example, include one or more examples managed, generated, and/or the like by ML platform 408, for example, based at least in part on the data communicated at (208), (212), (216), and/or the like (e.g., from application(s) 402, 404, and/or 406, via the API, and/or the like), the data communicated at (202), (204), (218), and/or the like.

In some embodiments, ML models 416, 418, and/or 420 can be, otherwise include, and/or the like various ML models, such as neural networks (e.g., deep neural networks, and/or the like), other types of ML models, including non-linear models, linear models, multilayer models, and/or the like. Neural networks can include feed-forward neural networks, recurrent neural networks (e.g., long short-term memory recurrent neural networks, and/or the like), convolutional neural networks, other forms of neural networks, and/or the like. In some embodiments, ML models 416, 418, and/or 420 can be trained using supervised techniques, semi-supervised techniques, unsupervised techniques, and/or the like.

Returning to FIG. 2B, at (222), user input with respect to imagery can be provided via computing device 10, and, at (224), computing device 10 can generate (e.g., based at least in part on the user input, and/or the like) data describing the imagery, one or more aspects of the imagery, the user input, and/or the like and can communicate (e.g., via the API provided by ML platform 408, and/or the like) such data to computing system 112, which can receive the data. The imagery can comprise a plurality of different and distinct frames (e.g., individual still images, component frames of one or more videos, and/or the like).

Figure 3C:
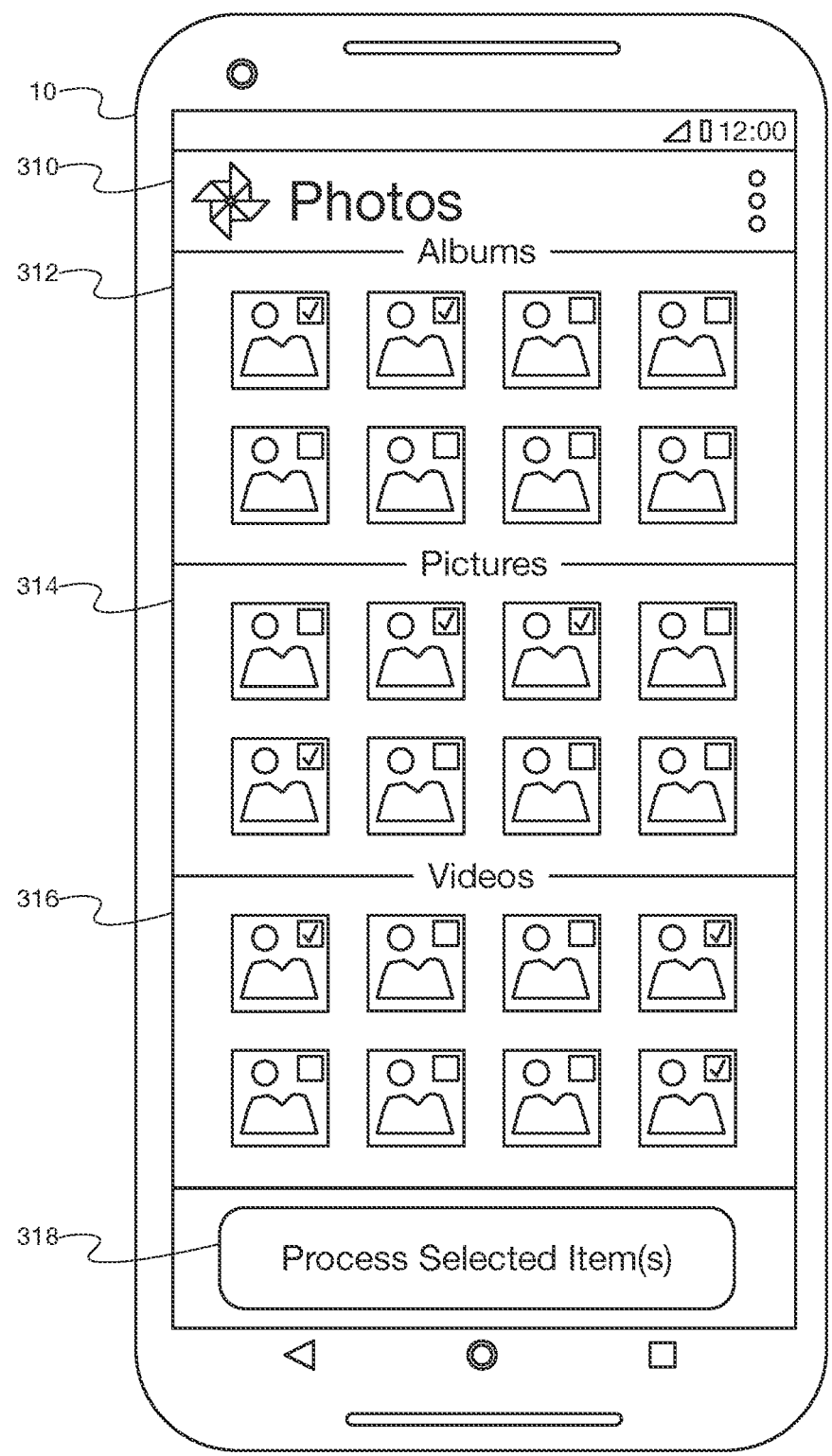

For example, referring to FIG. 3C, portion 310 of the illustrated GUI can be associated with application 402 (e.g., the photo-management application, and/or the like) and can include one or more portions 312, 314, and/or 316, as well as element 318. Imagery can be selected via application 402, and the selected imagery can comprise a plurality of different and distinct frames. For example, the imagery can include one or more frames from imagery included in one or more selected albums identified within portion 312, one or more frames from selected imagery identified within portion 314, one or more frames from imagery included in one or more selected videos identified within portion 316, and/or the like. Responsive to element 318 being invoked (e.g., in association with a request via application 402 to identify one or more frames within the selected imagery determined to be suitable for one or more of the various different and distinct uses for which ML models 416, 418, and/or 420 are configured to determine suitability of imagery, and/or the like), computing device 10 can generate data describing the selected imagery, one or more aspects of the selected imagery, and/or the like and can communicate (e.g., via the API provided by ML platform 408, and/or the like) such data to computing system 112, which can receive the data.

In some embodiments, one or more portions of the data described herein (e.g., the data communicated at (202), (204), (208), (212), (216), (218), (224), and/or the like) can be generated based at least in part on one or more arrangements of pixels included in imagery (e.g., the visual content of the imagery, and/or the like) but not be sufficient to enable reconstruction of such arrangement(s) (e.g., to mitigate privacy concerns, and/or the like).

Returning to FIG. 2B, at (226), based at least in part on ML models 416, 418, and/or 420 and the data describing the selected imagery, one or more scores can be determined for each frame of the plurality of different and distinct frames of the selected imagery. Each of the score(s) can indicate a determined measure of suitability of the frame with respect to one or more of the various different and distinct uses for which ML models 416, 418, and/or 420 are configured to determine suitability of imagery. For example, at (226A), computing device 10 can utilize ML models 416, 418, and/or 420 to determine one or more such scores for one or more of the plurality of different and distinct frames of the selected imagery. Additionally or alternatively, at (226B), computing system 112 can utilize ML models 416, 418, and/or 420 to determine one or more such scores for one or more of the plurality of different and distinct frames of the selected imagery.

In some embodiments, which of ML models 416, 418, and/or 420 are utilized to determine such scores can be specified (e.g., by data received via the API provided by ML platform 408, from application 402, in association with the request to identify one or more frames within the selected imagery determined to be suitable for one or more of the various different and distinct uses for which ML models 416, 418, and/or 420 are configured to determine suitability of imagery, and/or the like).

In some embodiments, computing device 10 and/or computing system 112 can determine, for one or more frames in a set of frames included in the plurality of different and distinct frames, one or more scores indicating the frame(s) in the set are determined to be better suited for one or more particular uses of the various different and distinct uses than each other frame in the set. In some of such embodiments, computing device 10 and/or computing system 112 can receive (e.g., via the API provided by ML platform 408, from application 402, and/or the like) data indicating the particular use(s) (e.g., in association with the request to identify one or more frames within the selected imagery determined to be suitable for one or more of the various different and distinct uses for which ML models 416, 418, and/or 420 are configured to determine suitability of imagery, and/or the like).

In some embodiments, the set of frames can include a series of contemporaneously generated similar frames (e.g., a burst, stream, and/or the like). Each frame in the series can include one or more subjects (e.g., people, animals, objects of focus, and/or the like) shared with each other frame in the series, and a contextual background (e.g., associated with the setting, surrounding environment, and/or the like), of the one or more subjects, shared with each other frame in the series. In some of such embodiments, the score(s) for the frames can be determined in real time, near real time, and/or the like, for example, enabling selection of one or more frames (e.g., determined to be suitable for one or more particular uses, and/or the like) from a buffer of contemporaneously generated frames, for example, thereby assisting a user in capturing one or more particular frames (e.g., a shot with all the subjects eyes simultaneously open, and/or the like). Additionally or alternatively, the set of frames can include a set of different and distinct frames including frames from multiple different and distinct series of frames. Each frame in such set can include one or more subjects different and distinct from each other frame in such set, and/or a contextual background, of one or more subjects of the frame in such set, different and distinct from each other frame in such set.

In some embodiments, computing device 10 and/or computing system 112 can receive (e.g., via the API provided by ML platform 408, from application 402, in association with the request to identify one or more frames within the selected imagery determined to be suitable for one or more of the various different and distinct uses for which ML models 416, 418, and/or 420 are configured to determine suitability of imagery, and/or the like) data indicating one or more particular subjects of the plurality of different and distinct frames, one or more particular expressions (e.g., smiling, open eyes, laughter, and/or the like) exhibited by subjects of the plurality of different and distinct frames, one or more particular events (e.g., scoring a point in a sporting event, and/or the like) depicted by the plurality of different and distinct frames, and/or the like. In some of such embodiments, determining the score(s) for each frame of the plurality of different and distinct frames can include identifying, from amongst the plurality of different and distinct frames, a set of frames that each include the particular subject(s), expression(s), event(s), and/or the like.

In some embodiments, determining the score(s) for each frame of the plurality of different and distinct frames can include determining the score(s) based at least in part on one or more quality metrics determined for the frame (e.g., regarding image quality, focus, blur, exposure, and/or the like). Additionally or alternatively, determining the score(s) can include identifying, counting, and/or the like incidences, occurrences, and/or the like of one or more particular subjects, groups of subjects, and/or the like.

In some embodiments, computing device 10 and/or computing system 112 can (e.g., in association with a request to identify one or more frames for inclusion in a slideshow, montage, and/or the like) determine, for each frame of one or more frames (e.g., based at least in part on the score(s) for such frame(s), and/or the like), a position of the frame in a series of frames for sequential presentation.

In some embodiments, computing device 10 and/or computing system 112 can utilize scene-analysis technology to determine, for each frame of one or more frames, one or more of the score(s) for the frame. For example, to determine one or more of such score(s), computing device 10 and/or computing system 112 can utilize one or more aspects of the technology described in U.S. patent application Ser. No. 14/984,628, filed Dec. 30, 2015, and entitled "SYSTEMS AND METHODS FOR SELECTIVE RETENTION AND EDITING OF IMAGES CAPTURED BY MOBILE IMAGE CAPTURE DEVICE," the disclosure of which is incorporated by reference herein in its entirety.

At (228), computing system 112 can generate data indicating, for each frame of one or more of the plurality of different and distinct frames, at least one of the score(s) for the frame, one or more positions of the frame in one or more series of frames for sequential presentation, and/or the like and can communicate (e.g., via the API provided by ML platform 408, to application 402, and/or the like) such data to computing device 10, which can receive the data.

Figure 3D:
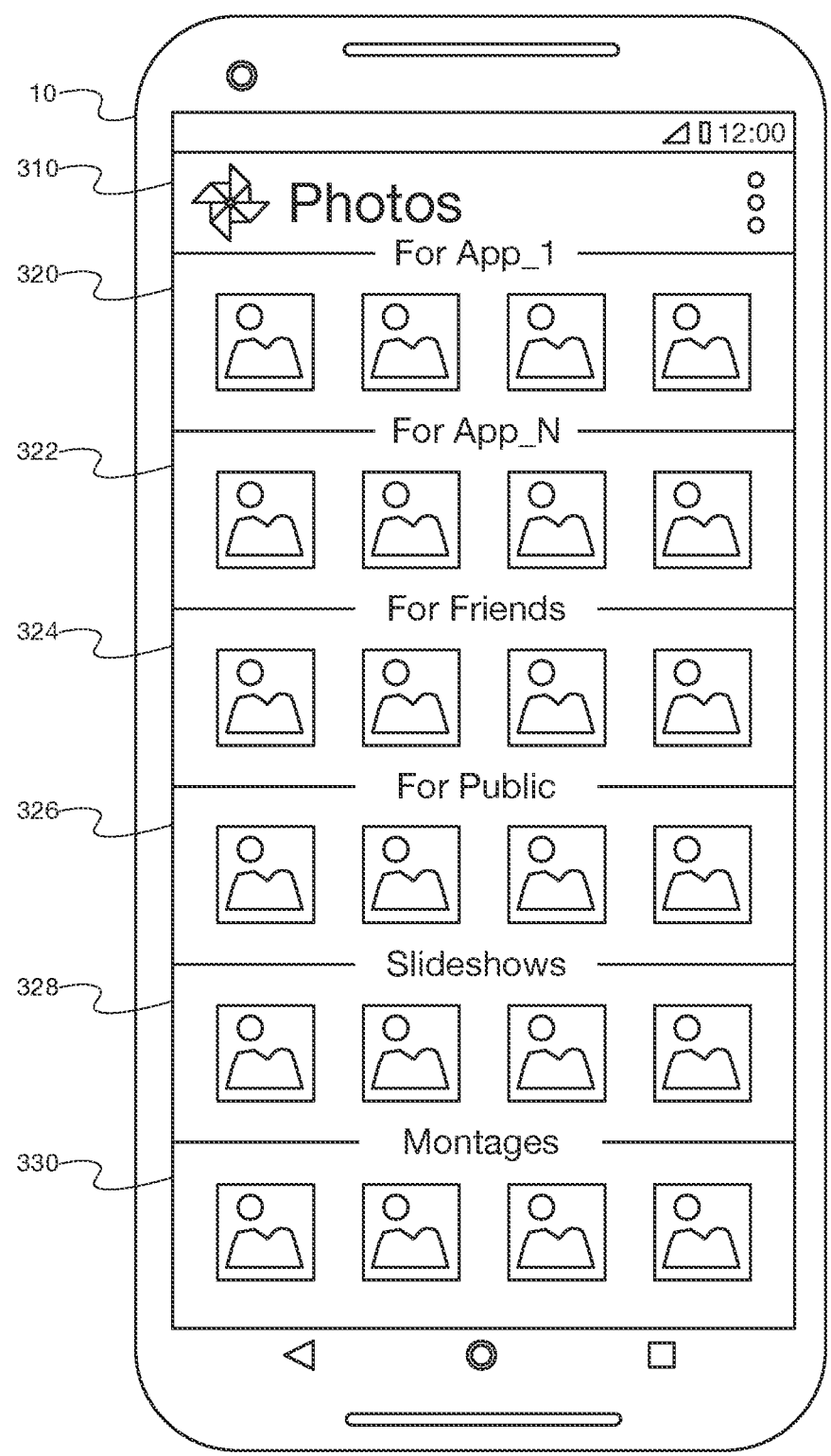

Based at least in part on such data, at (230), computing device 10 can generate output, for example, data describing an interface comprising a curation (e.g., for presentation, browsing, manipulation, and/or the like) of at least a portion of such frame(s). For example, referring to FIG. 3D, portion 320 of the illustrated GUI can identify one or more of the plurality of different and distinct frames determined to be suitable for a particular application (e.g., "App_1," and/or the like); portion 322 can identify one or more of the plurality of different and distinct frames determined to be suitable for a different and distinct application (e.g., "App_N," and/or the like); portion 324 can identify one or more of the plurality of different and distinct frames determined to be suitable for a particular audience (e.g., "Friends," and/or the like); portion 326 can identify one or more of the plurality of different and distinct frames determined to be suitable for a different and distinct audience (e.g., "Public," and/or the like); portion 328 can identify one or more series of frames for sequential presentation (e.g., "Slideshows," and/or the like) comprising one or more of the plurality of different and distinct frames at one or more particular positions for which they were determined to be suitable, and/or the like; and portion 330 can identify one or more different and distinct series of frames for sequential presentation (e.g., "Montages," and/or the like) comprising one or more of the plurality of different and distinct frames at one or more particular positions for which they were determined to be suitable, and/or the like.

Figure 5:
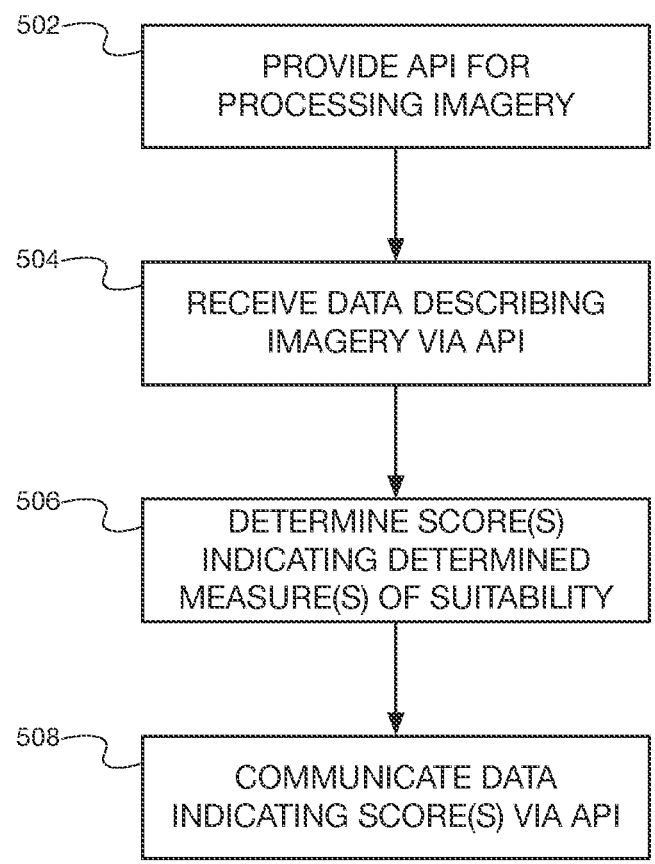
FIG. 5 depicts an example method according to example embodiments of the present disclosure.

FIG. 5 depicts an example method according to example embodiments of the present disclosure.

Referring to FIG. 5, at (502), one or more computing devices can provide an API for processing imagery using one or more ML models to identify imagery determined to be suitable for one or more different and distinct uses for which the ML model(s) are configured to determine suitability of imagery. For example, computing device 10 and/or computing system 112 can provide an API (e.g., the API provided by ML platform 408, and/or the like) for processing imagery using ML models 416, 418, and/or 420.

At (504), the computing device(s) can receive, via the API, data describing imagery comprising a plurality of different and distinct frames for processing using the ML model(s). For example, computing device 10 and/or computing system 112 can receive (e.g., via the API provided by ML platform 408, and/or the like) data describing the imagery selected via application 402.

At (506), the computing device(s) can determine, for each frame of the plurality of different and distinct frames, one or more scores for the frame, each score of the score(s) indicating a determined measure of suitability of the frame with respect to one or more of the different and distinct uses for which the ML model(s) are configured to determine suitability of imagery. For example, computing device 10 and/or computing system 112 can utilize ML models 416, 418, and/or 420 to determine, for each frame of the plurality of different and distinct frames of the imagery selected via application 402, one or more scores for the frame.

At (508), the computing device(s) can communicate, via the API, data indicating, for each frame of one or more frames of the plurality of different and distinct frames, at least one of the score(s) for the frame. For example, computing device 10 and/or computing system 112 can communicate (e.g., via the API provided by ML platform 408, and/or the like) data indicating, for each frame of one or more frames of the plurality of different and distinct frames of the imagery selected via application 402, at least one of the score(s) for the frame.

The technology discussed herein refers to servers, databases, software applications, and/or other computer-based systems, as well as actions taken and information sent to and/or from such systems. The inherent flexibility of computer-based systems allows for a great variety of possible configurations, combinations, and/or divisions of tasks and/or functionality between and/or among components. For instance, processes discussed herein can be implemented using a single device or component and/or multiple devices or components working in combination. Databases and/or applications can be implemented on a single system and/or distributed across multiple systems. Distributed components can operate sequentially and/or in parallel.

Various connections between elements are discussed in the above description. These connections are general and, unless specified otherwise, can be direct and/or indirect, wired and/or wireless. In this respect, the specification is not intended to be limiting.

The depicted and/or described steps are merely illustrative and can be omitted, combined, and/or performed in an order other than that depicted and/or described; the numbering of depicted steps is merely for ease of reference and does not imply any particular ordering is necessary or preferred.

The functions and/or steps described herein can be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (ROM), random-access memory (RAM), and/or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field-programmable gate arrays (FPGAs), and/or the like. Particular data structures can be used to more effectively implement one or more aspects of the disclosure, and such data structures are contemplated to be within the scope of computer-executable instructions and/or computer-usable data described herein.

Although not required, one of ordinary skill in the art will appreciate that various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and acts can be operative across one or more computing devices and/or networks. The functionality can be distributed in any manner or can be located in a single computing device (e.g., server, client computer, user device, and/or the like).

Aspects of the disclosure have been described in terms of illustrative embodiments thereof. Numerous other embodiments, modifications, and/or variations within the scope and spirit of the appended claims can occur to persons of ordinary skill in the art from a review of this disclosure. For example, one or ordinary skill in the art can appreciate that the steps depicted and/or described can be performed in other than the recited order and/or that one or more illustrated steps can be optional and/or combined. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a further embodiment. Thus, it is intended that the present disclosure cover such alterations, variations, and/or equivalents.

What is claimed is:

1. A computer-implemented method comprising:
   providing, by one or more computing devices, one or more machine learning (ML) models configured to process imagery to identify images determined to be suitable for one or more different and distinct uses;

receiving, by the one or more computing devices, data describing imagery comprising a plurality of different and distinct frames for processing using the one or more ML models;

determining, by the one or more computing devices, based at least in part on the one or more ML models and the data describing the imagery, and for each frame of the plurality of different and distinct frames, one or more scores for the frame, each score of the one or more scores indicating a determined measure of suitability of the frame with respect to a use of the one or more different and distinct uses; and communicating, by the one or more computing devices, data indicating, for each frame of one or more frames of the plurality of different and distinct frames, at least one of the one or more scores for the frame.

2. The computer-implemented method of claim 1, wherein:

the plurality of different and distinct frames comprises a series of contemporaneously generated similar frames; and communicating, by the one or more computing devices, data indicating, for each frame of one or more frames of the plurality of different and distinct frames, at least one of the one or more scores for the frame comprises selecting the frame determined to be suitable for the use from a buffer of the series of contemporaneously generated similar frames.

3. The computer-implemented method of claim 2, wherein communicating, by the one or more computing devices, data indicating, for each frame of one or more frames of the plurality of different and distinct frames, at least one of the one or more scores for the frame further comprises providing a graphical user interface within a photograph management application, wherein the graphical user interface identifies the frame determined to be suitable for the use from the buffer of the series of contemporaneously generated similar frames.

4. The computer-implemented method of claim 3, wherein the graphical user interface indicates a position of the frame in the series of contemporaneously generated similar frames.

5. The computer-implemented method of claim 1, wherein:

the one or more different and distinct uses include a use with a particular application; and the determining comprises determining, for one or more frames in a set of frames included in the plurality of different and distinct frames, one or more scores indicating the one or more frames in the set are determined to be better suited for use with the particular application than each other frame in the set.

6. The computer-implemented method of claim 1, wherein:

the one or more different and distinct uses include a use with a particular audience; and the determining comprises determining, for one or more frames in a set of frames included in the plurality of different and distinct frames, one or more scores indicating the one or more frames in the set are determined to be better suited for use with the particular audience than each other frame in the set.

7. The computer-implemented method of claim 1, wherein:

the method comprises receiving, by the one or more computing devices, data indicating one or more particular subjects of the plurality of different and distinct frames; and the determining comprises:
identifying, from amongst the plurality of different and distinct frames, a set of frames that each include the one or more particular subjects; and
determining, for one or more frames in the set of frames, one or more scores indicating the one or more frames in the set are determined to be better suited for a particular use of the one or more different and distinct uses than each other frame in the set.

8. The computer-implemented method of claim 1, wherein:

the method comprises receiving, by the one or more computing devices, data indicating one or more particular expressions exhibited by subjects of the plurality of different and distinct frames; and the determining comprises:
identifying, from amongst the plurality of different and distinct frames, a set of frames that each include the one or more particular expressions; and
determining, for one or more frames in the set of frames, one or more scores indicating the one or more frames in the set are determined to be better suited for a particular use of the one or more different and distinct uses than each other frame in the set.

9. The computer-implemented method of claim 1, wherein:

the method comprises receiving, by the one or more computing devices, data indicating one or more particular events depicted by the plurality of different and distinct frames; and the determining comprises:
identifying, from amongst the plurality of different and distinct frames, a set of frames that each depict the one or more particular events; and
determining, for one or more frames in the set of frames, one or more scores indicating the one or more frames in the set are determined to be better suited for a particular use of the one or more different and distinct uses than each other frame in the set.

10. The computer-implemented method of claim 1, comprising generating, by the one or more computing devices and based at least in part on the data indicating the at least one of the one or more scores, data describing an interface comprising a curation of at least a portion of the one or more frames.

11. The computer-implemented method of claim 1, wherein receiving the data describing the imagery comprises receiving data:

generated based at least in part on one or more arrangements of pixels included in the imagery; and that is not sufficient to enable reconstruction of the one or more arrangements of the pixels included in the imagery.

12. The computer-implemented method of claim 1, comprising:

determining, by the one or more computing devices, for each frame of the one or more frames, and based at least in part on the at least one of the one or more scores for the frame, a position of the frame in a series of frames for sequential presentation; and communicating, by the one or more computing devices, data indicating, for each frame of one or more frames, the position of the frame in the series of frames for sequential presentation.

13. A system comprising:
one or more processors; and
a memory storing instructions that when executed by the one or more processors cause the system to perform operations comprising:
receiving data describing imagery comprising a plurality of different and distinct frames;
determining, based at least in part on one or more machine learning (ML) models and the data describing the imagery, and for each frame of the plurality of different and distinct frames, one or more scores for the frame, each score of the one or more scores indicating a determined measure of suitability of the frame with respect to one or more of various different and distinct uses for which the one or more ML models are configured to determine suitability of imagery; and
providing a graphical user interface that identifies at least one of the frames as suitable for the one or more of various different and distinct uses based at least in part on the scores determined for the plurality of different and distinct frames.

14. The system of claim 13, wherein:
the plurality of different and distinct frames comprises a series of contemporaneously generated similar frames, each frame in the series comprising:
one or more subjects shared with each other frame in the series, and
a contextual background, of the one or more subjects, shared with each other frame in the series; and
the determining comprises determining, for one or more frames in the series, one or more scores indicating the one or more frames in the series are determined to be better suited for a particular use of the one or more of the various different and distinct uses than each other frame in the series.

15. The system of claim 13, wherein:
the plurality of different and distinct frames comprises a set of different and distinct frames including frames from multiple different and distinct series of frames, each frame in the set comprising one or more of:
one or more subjects different and distinct from each other frame in the set, or
a contextual background, of one or more subjects of the frame in the set, different and distinct from each other frame in the set; and
the determining comprises determining, for one or more frames in the set, one or more scores indicating the one or more frames in the set are determined to be better suited for a particular use of the one or more of the various different and distinct uses than each other frame in the set.

16. One or more non-transitory computer-readable media that store instructions that, when executed by one or more processors, cause the one or more processors to perform operations, the operations comprising:
receiving data describing imagery comprising a plurality of different and distinct frames;
determining, based at least in part on one or more machine learning (ML) models and the data describing the imagery, and for each frame of the plurality of different and distinct frames, one or more scores for the frame, each score of the one or more scores indicating a determined measure of suitability of the frame with respect to one or more of various different and distinct uses for which the one or more ML models are configured to determine suitability of imagery; and
providing a graphical user interface that identifies at least one of the frames as suitable for the one or more of various different and distinct uses based at least in part on the scores determined for the plurality of different and distinct frames.

17. The one or more non-transitory computer-readable media of claim 16, wherein:
the plurality of different and distinct frames comprises a series of contemporaneously generated similar frames, each frame in the series comprising:
one or more subjects shared with each other frame in the series, and
a contextual background, of the one or more subjects, shared with each other frame in the series; and
the determining comprises determining, for one or more frames in the series, one or more scores indicating the one or more frames in the series are determined to be better suited for a particular use of the one or more of the various different and distinct uses than each other frame in the series.

18. The one or more non-transitory computer-readable media of claim 16, wherein:
the plurality of different and distinct frames comprises a set of different and distinct frames including frames from multiple different and distinct series of frames, each frame in the set comprising one or more of:
one or more subjects different and distinct from each other frame in the set, or
a contextual background, of one or more subjects of the frame in the set, different and distinct from each other frame in the set; and
the determining comprises determining, for one or more frames in the set, one or more scores indicating the one or more frames in the set are determined to be better suited for a particular use of the one or more of the various different and distinct uses than each other frame in the set.

* * * * *